US004001627B2

United States Statutory Invention Registration [19]

[11] Reg. Number: H1627

[45] Published: Jan. 7, 1997

Broz et al.

[54] METHOD OF AND APPARATUS FOR IMAGE PROCESSING USING A VARIABLE FOCAL SPOT SIZE

[75] Inventors: Alfred Broz, Marlboro; William H. Green, Stow, both of Mass.

[73] Assignee: The United States of America as represented by the Secretary of the Army, Washington, D.C.

[21] Appl. No.: 189,388

[22] Filed: Jan. 31, 1994

[51] Int. Cl.[6] ..... H05G 1/08

[52] U.S. Cl. ..... 378/98.12

[58] Field of Search ..... 378/98.12

[56] References Cited

U.S. PATENT DOCUMENTS

| | | | |
|---|---|---|---|
| 4,722,097 | 1/1988 | Haendle | 378/98.12 |
| 5,031,620 | 7/1991 | Oe | 128/653 |
| 5,038,369 | 8/1991 | Nishiki | 378/62 |
| 5,060,254 | 10/1991 | de Fraguier et al. | 378/136 |
| 5,081,659 | 1/1992 | Dobbbins, III | 378/99 |
| 5,117,445 | 5/1992 | Seppi et al. | 378/65 |
| 5,132,998 | 7/1992 | Tsutsui et al. | 378/99 |

OTHER PUBLICATIONS

David Malin, "Extracting the Image in Astronomical Photography", *Kodak Tech Bits–Bringing Imaging Techniques to Scientists and Engineers*, Issue No. 1, 1990, pp. 1–10.

"Calculation of Geometric Unsharpness", *Nondestructive Testing Handbook, Second Edition, vol. Three, Radiography & Radiation Testing*, pp. 196, 274, 604 and 605.

*Primary Examiner*—Bernarr E. Gregory

*Attorney, Agent, or Firm*—Freda L. Krosnick; Frank J. Dynda; Muzio B. Roberto

[57] ABSTRACT

A method of and apparatus for the non-destructive inspection and/or evaluation of materials by the computer processing of images produced on/by an image conversion screen/device is disclosed in which the images are produced by placing the object to be inspected and/or evaluated between the screen/device and a source of x-rays from an x-ray machine having the capability of varying its focal spot area size. Two images, one created with a large focal spot size and one created with a small focal spot size are processed and then combined in such a manner so as to accentuate the fine structure detail in the resulting image.

4 Claims, 2 Drawing Sheets

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

METHOD OF AND APPARATUS FOR IMAGE PROCESSING USING A VARIABLE FOCAL SPOT SIZE

BACKGROUND OF THE INVENTION

The present invention relates generally to the non-destructive inspection and evaluation of materials using x-rays. More particularly, the present invention relates to a method of and system for performing non-destructive inspection and evaluation of materials by the computer processing of images produced on/by an image conversion screen/device.

When non-destructively inspecting and/or evaluating materials using x-rays, difficulties have arisen in creating images of the materials being tested or evaluated with regard to the detail of the fine structure in such materials. This lack of fine structural detail is due to the interference structures of the transmission components of the imaging system, for example, the interference structures of the input luminescent fluoroscopic screen or the semi-conductor materials of the CCD camera which translates the fluoroscopic image.

One approach to dealing with similar problems in an x-ray diagnostic installation is disclosed in U.S. Pat. No. 4,722,097, which issued on Jan. 26, 1988 to Haendle. That patent describes an x-ray diagnostics installation with spatial frequency high-pass filtering in which the fine contrasts required in x-ray technology are intensified without the interference structures generated by the system components so as to improve the ability of the system to recognize fine details in the x-ray pictures. The system disclosed in that patent utilizes an x-ray tube in which the size of the tube focus can be varied. A video signal for an x-ray exposure produced by a given first size of the tube focus is entered into a memory and is subtracted from a previously stored video signal for an x-ray exposure recorded using a second size of the tube focus. The result of the subtraction of these two transfer functions yields a resulting transfer function in which the low frequencies are suppressed and the higher frequencies are amplified. However, the system disclosed by Haendle is complex and costly to both implement and maintain.

SUMMARY AND OBJECTS OF THE INVENTION

In view of the foregoing, it should be apparent that there still exists a need in the art for a method of and apparatus for creating images so as to accentuate the fine structural detail in them in the non-destructive inspection and/or evaluation of materials produced on/by an image conversion screen/device. It is, therefore, a primary object of this invention to provide a method of and apparatus for accentuating the fine structure detail of an image on/by an image conversion screen/device which is characterized by the computer processing of such images produced by generating two images of the object under test using two different focal spot sizes of an x-ray machine.

More particularly, it is an object of this invention to provide images produced on/by an image conversion screen/device having accentuated fine structural detail in them which is simple to implement and utilizes reliable electronic circuitry which does not require frequent alignment nor costly components.

Briefly described, these and other objects of the invention are accomplished by providing as a source of x-rays an x-ray machine with the capability of a variable focal spot size. The object to be studied is placed between the source of x-rays and an image conversion screen/device and then irradiated by the x-ray machine with its focal spot size at two different settings. The image from the image conversion screen/device is then processed by a computer to create an image of the object under test in which the fine structural detail has been accentuated.

The two images produced using the two different focal spot sizes are processed as follows. With the larger focal spot size, image processing software contained within the computer is used to decrease the image noise and increase the image signal-to-noise ratio. An image with a reduced and minimum of fine structure detail is produced which is then stored in the memory of the computer.

The image obtained using the smaller focal spot size is obtained and stored in the computer memory. Then, a difference image is produced by subtracting one of the images from the other. Since only the image produced using the smaller focal spot size contains relatively fine structure detail, the resulting difference image contains only the fine structure detail.

With these and other objects, advantages and features of the invention that may become hereinafter apparent, the nature of the invention may be more clearly understood by reference to the following detail description of the invention, the appended claims and to the several drawings herein.

DETAILED DESCRIPTION OF THE PREFERRED EMBODIMENT

Figure 1:
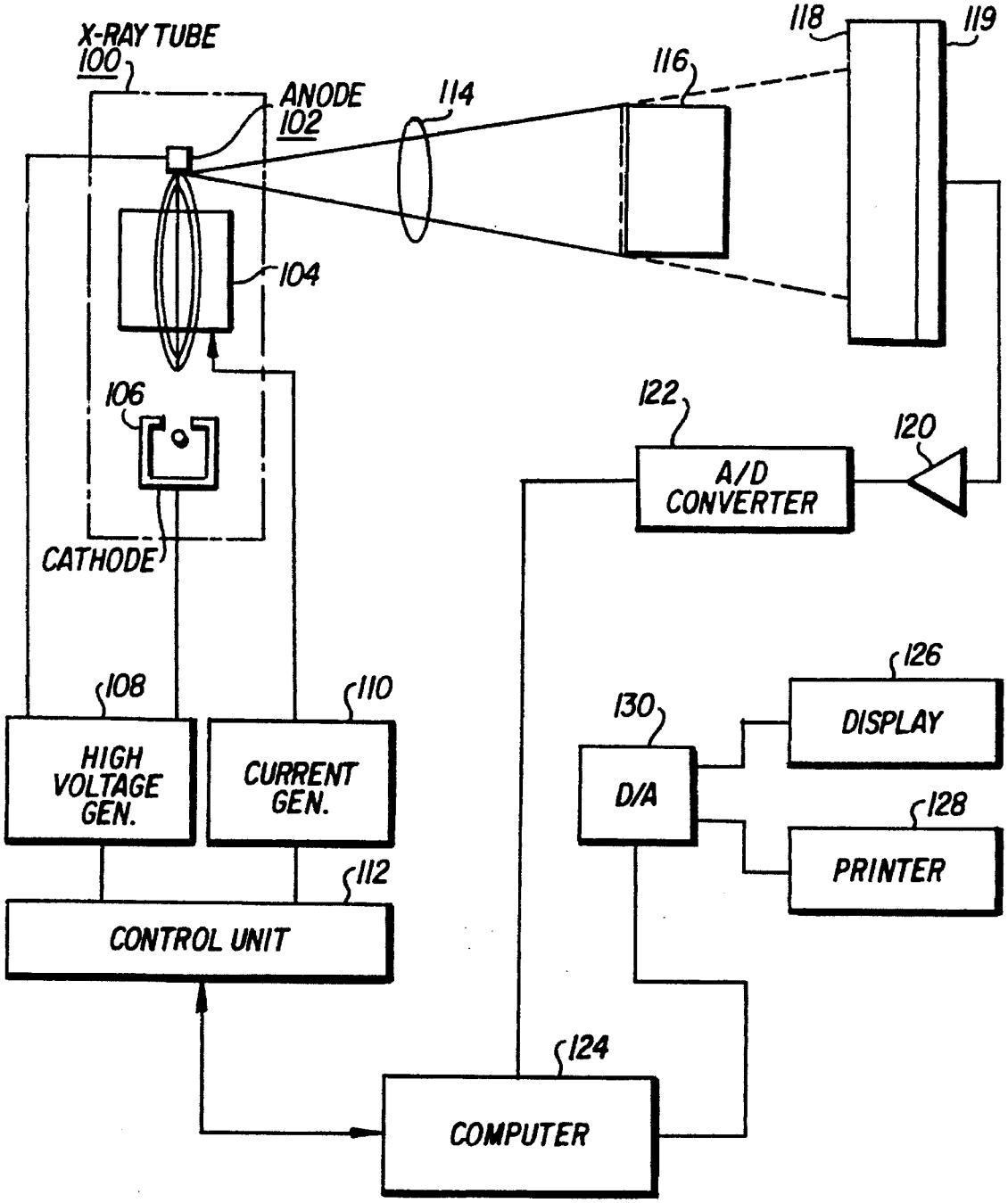
FIG. 1 is a block diagram showing the apparatus of the present invention.

Referring now in detail to the drawings wherein like parts are designated by like reference numerals throughout, there is illustrated in FIG. 1 a block diagram showing the apparatus of the present invention. As shown in FIG. 1, an x-ray tube 100 having an electromagnetic focusing lens 104 which is controlled by a focusing current generator 110 is used to generate a vertical focal size spot 114. The x-ray tube 100 also includes an anode 102 and a cathode 106, both of which are connected to a high-voltage generator 108, in a known fashion. The electromagnetic lens 104 focuses the electrons created when a high voltage is present across the anode 102 and cathode 106 and focuses the electrons emitted from the cathode 106 which, upon striking the anode 102, generates the x-ray beam. A central control unit 112 is connected to both the high voltage generator 108 and the focusing current generator 110, as well as to the computer 124, whose operation will be described hereinafter.

The x-ray beam generated by the x-ray tube 100 is used to penetrate the material or object under test 116 and to generate an image on an image conversion screen/device 118, such as a fluoroscopic screen. The radiation striking the image conversion screen/device 118 is converted into a visible image by the image conversion screen/device 118, is detected by a converter 119, such as a CCD camera, which serves to convert the visible image into a video signal. The video signal taken from the converter 119 is amplified by a video amplifier 120 and then convened from an analog to a digital signal by the A/D converter 122. The digital output from the analog-to-digital converter 122 is supplied to the computer 124 for processing. The computer is connected to both a display device 126 and a printer 128 for displaying, after the processing to be described hereinafter, the desired image of the object under test 116.

Using the x-ray tube 100 together with the voltage and current generators 108 and 110 and control unit 112, the focal spot size of the x-ray tube 100 can be varied from a large to a small focal spot size 114. The control unit 112, either manually or under control of the computer 124, causes the focusing current generator 110 to supply the electromagnetic lens 104 with a current of a magnitude sufficient to adjust the focal spot size 114 of the x-ray tube 100. In that manner, the focal spot size 114 can be varied from large to small. The high voltage generator 108 is then energized so that, for example, the object under test is exposed, using a large focal spot size. The video signal which results from the image detected by the converter 119 is then sent to the computer 124 for processing.

The focusing current is then modified, using the control unit 112, either manually or under control of the computer 124, such that the focal spot size is changed to a small focal spot size, relative to the focal spot size used for the first image. The video signal generated by the converter 119 is then also stored in the computer 124 for later processing. The digital information relating to each image as well as a plurality of others, may be stored either in volatile or non-volatile memory in the computer 124 such as, for example, in RAM memory or magnetic memory such as hard or floppy disk drives. Subsequently, the two images, in which the focal spot size is large in one image compared to the other image, are processed and then subtracted from each other to result in digital information directly corresponding to the desired image. That digital information is converted to an analog signal by the D/A converter 130 and then may be displayed on the display 126, which may be a CRT or video monitor. If a permanent copy of the image is desired, it may be generated using the printer 128.

Figure 2:
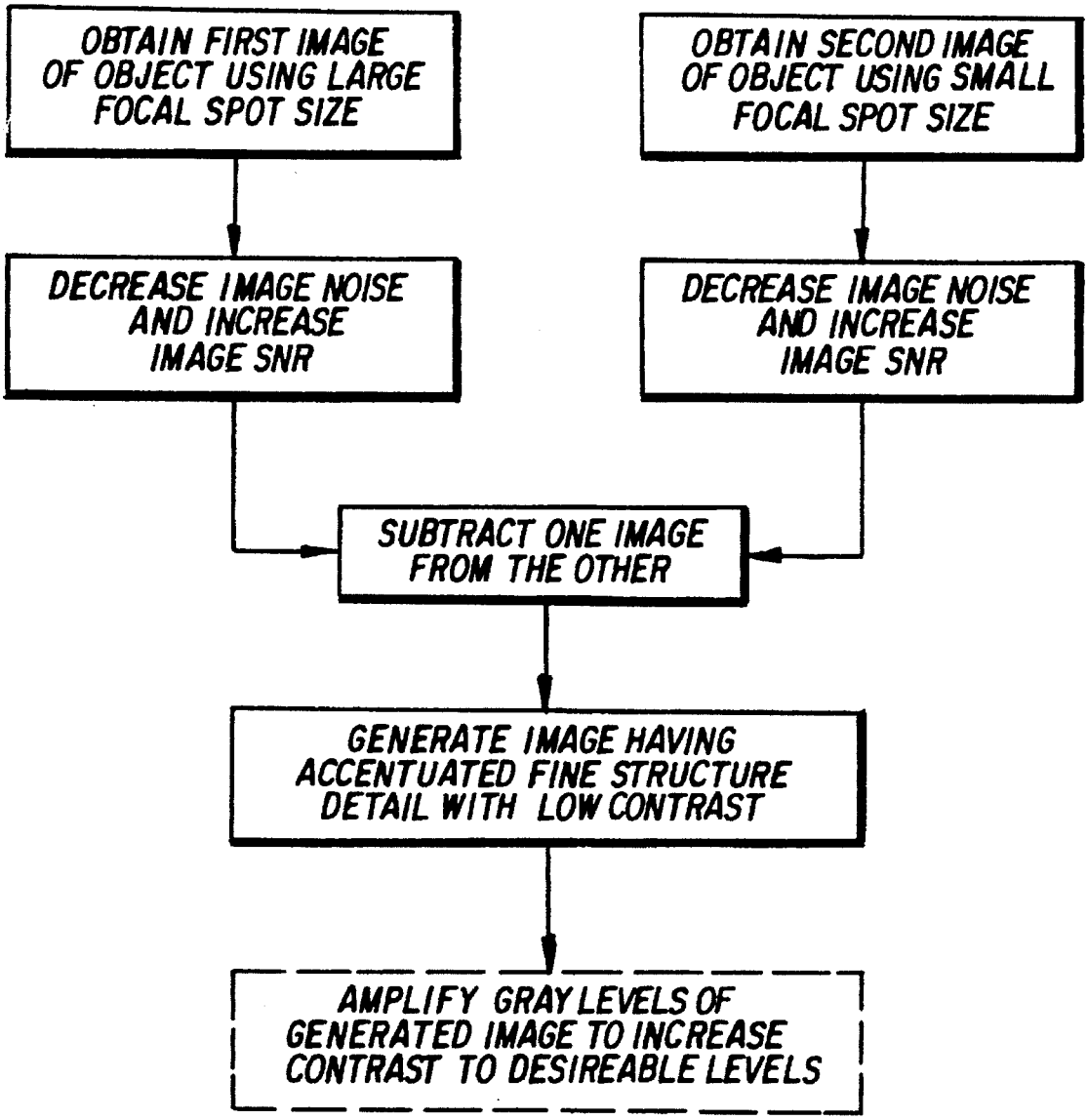
FIG. 2 is a diagram illustrating the method of the present invention.

Referring now also to FIG. 2, which is a diagram showing the steps performed by the apparatus of the present invention shown in FIG. 1, a first or mask image is obtained by utilizing a large focal spot size 114 generated by the x-ray tube 100 to irradiate the material or object under test 116, as described above in connection with FIG. 1. Using such a large focal spot size and, preferably, the largest focal spot size that can be generated by the x-ray tube 100, a maximum geometric unsharpness of the resulting image in the image conversion screen/device 118 would be achieved. Using the largest focal spot size maximizes the total unsharpness of the image, producing a blurring effect on a scale of magnitude equal to the total unsharpness. The resulting mask image is an image that has been made unsharp such that relatively coarse structure detail in the image is still apparent, but relatively fine structure detail has been reduced or eliminated.

Once the digitized representation of the image produced by the image conversion screen/device 118 is sent to the computer 124, it is processed using commercially available image processing computer software, such as the ICOS level 1.12 software available from Quantex Corporation of Rockville, Md. The computer 124 may preferably be a 80486-DX based IBM or compatible computer or a Quantex QX-9000 Series computer. It should be noted however, that other commercially available image processing computer software besides that made by Quantex Corporation can be utilized in connection with the computer 124 in order to process the digitized mask image as describe hereinafter.

The averaging and summing modes of the image processing software are used to modify the digitized mask image signal in order to reduce the image noise and to increase the image signal-to-noise ratio (SNR). The result of using either of those two modes to operate on the digitized mask image is an image having reduced noise and a minimum of fine structure detail. While it should be understood that the technique of modifying the mask image signal using either or both of the averaging and summing modes of such available image processing software would serve to decrease image noise and increase the SNR of the mask image, the present invention can be utilized by directly storing the mask image in a memory of the computer 124, without modifying the mask image to increase or decrease signal properties.

Another alternative is to utilize the spatial filtering modes of image processing software; such as the ICOS software available from Quantex Corporation, to allow the user to "average" an image. Such spatial averaging serves to reduce or eliminate the low contrast detail on a scale of magnitude determined by the software user. Using this alternative, an image can be blurred such that only the relatively coarse structure detail image would be reproduced. Conversely, the relatively fine structure detail would not be reproduced. However, the use of a large focal spot size to produce the mask image, as opposed to a small focal spot size, would have the same relative effect on the image structure. Therefore, while the spatial filtering modes of image processing software can be used in conjunction with the mask image generated using a large focal spot size, it is not necessary to do so.

The other image which is used in combination with the mask image is obtained as follows. The control unit 112 is operated as described above such that a smaller focal spot size is generated by the x-ray tube 100. Preferably, the smallest focal spot size that can be generated using the x-ray tube 100 would be used. Using the smallest focal spot size available serves to minimize the geometric unsharpness of the resulting image. Minimizing the geometric unsharpness of the resulting image in turn minimizes the total unsharpness of that image which in turn maximizes the relatively fine structure detail in the resulting image.

The image produced by the image conversion screen/device 118 and digitized as described above is stored in the computer 124 and then modified using the averaging or summing modes of the image processing software, as discussed above in connection with the image produced using the large focal spot size. Again, it should be understood that the present invention does not require the use of the averaging or summing modes of the image processing software and can be utilized satisfactorily with the digitized small focal spot size image stored directly in its unmodified state. It should further be pointed out that it is not necessary that the mask image and the second image be obtained in a certain order. Either image can be obtained first and then utilized as described as follows in connection with the other image.

After both the mask and the second images have been obtained and, processed, if desired, as described above, a difference image is produced by subtracting one image from the other. That is accomplished utilizing the image processing software operating on the computer 124. The resulting difference image is stored in the memory of the computer 124, in a manner similar to that discussed above in connection with the mask and second images.

Since both the mask image and the second image, whether modified or not, contain relatively coarse structure detail, but only the second image contains relatively fine structure detail, the difference image itself contains only the fine structure detail. The difference image is the result of subtracting the mask image from the second image or subtracting the second image from the mask image. The order of subtraction is not important. In the event that the resulting difference image has a lower contrast level than desired, its gray levels can be offset and amplified to increase its contrast to the desired level.

It is also possible to obtain the difference image by inverting the gray level scale of the mask image or of the second image and then adding the resulting inverted image to the image which had not been inverted. In that case, the final image would be called an addition image.

Although only a preferred embodiment is specifically illustrated and described herein, it will be appreciated that many modifications and variations of the present invention are possible in light of the above teachings and within the purview of the appended claims without departing from the spirit and intended scope of the invention.

What is claimed is:

1. A method for the processing of converted images of an object in order to accentuate the fine structure detail of the object, comprising the steps of:

placing the object between an x-ray tube and an image conversion screen/device;

generating a mask image of said object using a large focal spot size of said x-ray tube;

generating a second image of said object using a small focal spot size of said x-ray tube;

decreasing the image noise and increasing the image signal-to-noise ratios for each of said mask and second images of said object;

subtracting said second image of said object from said mask image of said object to generate an image having accentuated fine structure detail, and amplifying the gray levels of said image having accentuated fine structure detail thereby increasing the contrast of said image having accentuated fine structure detail.

2. The method of claim 1, wherein the steps of decreasing the image noise and increasing the image signal-to-noise ratio for each of said mask and second images of said object prior to performing said step of subtracting are performed by a programmed computer.

3. The method of claim 1, including the further step of amplifying the gray levels of said image having accentuated fine structure detail to increase image contrast.

4. The method of claim 3, wherein the step of amplifying said gray levels is performed by a programmed computer.

* * * * *